H. L. LITCHFIELD AND V. SPEER.
SPREADER.
APPLICATION FILED MAR. 27, 1918.
1,313,638.
Patented Aug. 19, 1919.
3 SHEETS—SHEET 1.
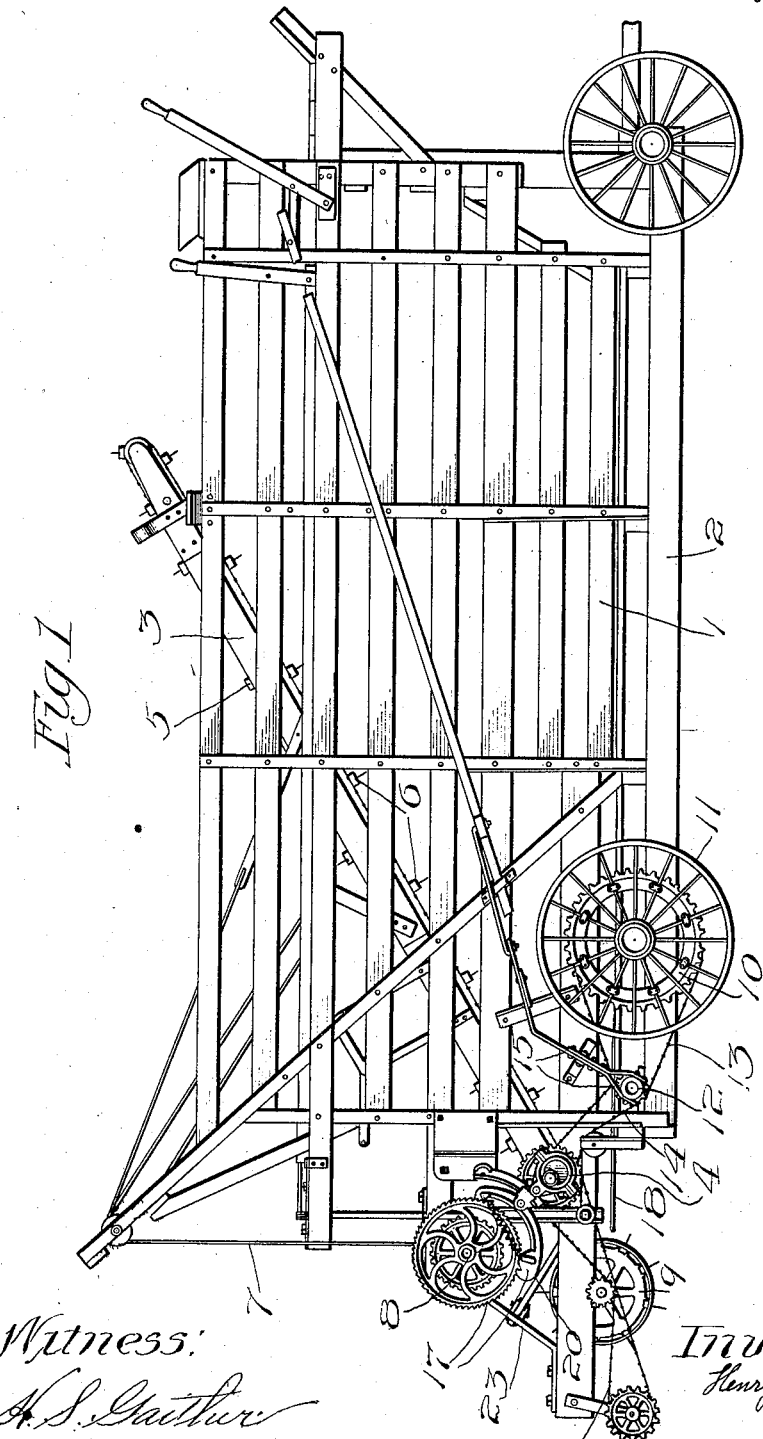

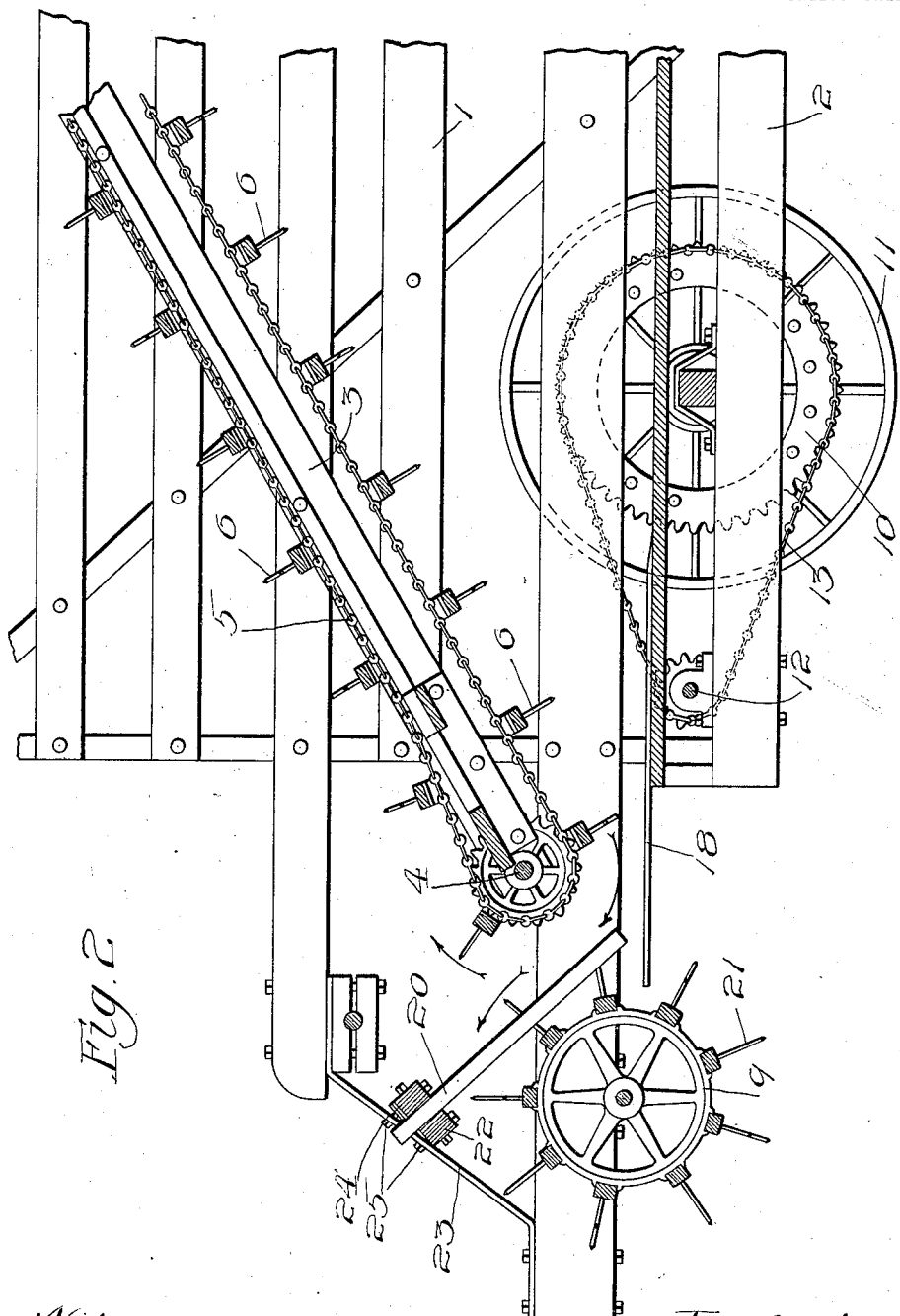

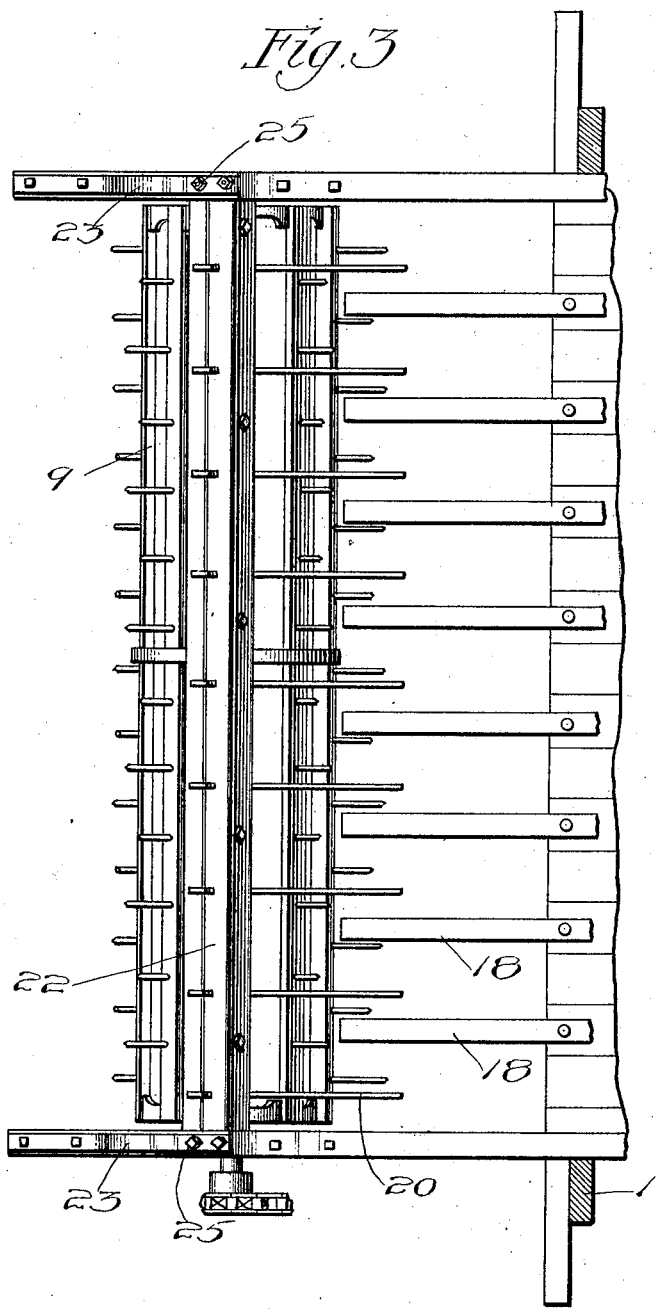

UNITED STATES PATENT OFFICE.

HENRY L. LITCHFIELD AND VICTOR SPEER, OF WATERLOO, IOWA; SAID SPEER ASSIGNOR TO SAID LITCHFIELD.

SPREADER.

1,313,638.      Specification of Letters Patent.      Patented Aug. 19, 1919.

Application filed March 27, 1918. Serial No. 224,935.

*To all whom it may concern:*

Be it known that we, HENRY L. LITCHFIELD and VICTOR SPEER, citizens of the United States, residing at Waterloo, county of Blackhawk, State of Iowa, have invented a certain new and useful Improvement in Spreaders, and declare the following to be a full, clear, and exact description of the same, such as will enable others skilled in the art to which it pertains to make and use the same, reference being had to the accompanying drawings, which form a part of this specification.

The present invention relates to the art of distributing or spreading straw, manure containing a considerable amount of straw, or other similar material, over the surface across which a vehicle loaded with the material is traveling. In our prior application filed on the 19th day of March, 1918, Serial No. 223,263, we have disclosed a machine of this general character. In the construction disclosed in our prior application there is a distributer or beater wheel located at the rear end of the spreaded, and the material is fed thereto by means of an endless rake which is maintained in contact with the top of the load and feeds material therefrom to the distributer or beater wheel. Materials which may be regarded as being similar to each other, in a general way, cannot always be spread or distributed most effectively by identically the same distributing means. In the arrangement shown in our prior application the beater wheel revolves in such a direction that the pins or teeth at the top are traveling toward the rake while those at the bottom are traveling away from the rake, thus causing the material to be drawn down underneath the beater wheel and discharged directly upon the ground. We have discovered that some kinds of materials which it is advisable to deliver to the beater wheel by feeding from the top of the load, without moving the entire load at any one time, tend to bunch up at the point where delivery from the rake to the distributer takes place, thus interfering more or less with proper distribution.

The object of the present invention, viewed in one of its aspects, is so to modify the structure shown in our aforesaid application that the rate of feed of the material is not fixed by the rate of distribution but may be such as to deliver just the amount required by the distributer or else an excess amount without danger of bunching or clogging the mechanism.

In carrying out our present invention we reverse the direction of rotation of the beater wheel or distributer so that it runs in the opposite direction from that in our prior construction, and so place the guard teeth or comb located between the endless rake and the distributer or beater wheel that as the material is fed to the beater wheel the latter takes what is can or needs and, if there be any excess, it is carried back to the top of the load and recirculated. Therefore, viewed in one of its aspects, our invention may be said to have for its object to produce a novel spreader in which the material will be fed to a distributer or beater wheel from the top of the load in such a manner that the material that is not required or taken by the distributer or beater wheel will be carried back to the top of the load and afterward be fed again to the distributing point.

The various features of novelty whereby our invention is characterized will hereinafter be pointed out with particularity in the claims, but, for a full understanding of our invention and of its objects and advantages, reference may be had to the following detailed description taken in connection with the accompanying drawings, wherein:

Figure 1 is a side elevation of a spreaded arranged in accordance with a preferred form of our invention;

Fig. 2 is a vertical longitudinal section, on a larger scale, taken through the rear or distributing end of the spreader; and Fig. 3 is a top plan view of the extreme rear end of the spreader.

Except for the change necessary to drive the beater wheel in the opposite direction from that in which it rotates in our aforesaid application, together with a slight change in the comb or guard fingers, the structure illustrated in the drawings is identical with that in our aforesaid application and, for the sake of brevity, only a general description of the spreader as a whole will now be given.

Referring to the drawings, 1 represents a broad, deep body or rack mounted on an underslung wheeled bed or frame, 2. A swinging frame, 3, is supported at its rear end upon a horizontal shaft, 4, extending transversely of the spreader at the rear end of the body or rack and just above the bottom of the latter. On the swinging frame is an endless conveyer, 5, which extends completely around the frame and is of a width substantially equal to the width of the body or rack. Projecting from the conveyer are raking teeth, 6. The frame may assume a substantially upright position at the rear end of the spreader or it may be swung down so as to lie close to the floor or bottom of the body or rack. The raising and lowering of the frame is accomplished through suitable cables, 7, connected to the frame at one end and wound at the other end upon a shaft, 8, above and parallel with the shaft 4. Behind and in rear of the shaft 4 is located a revoluble beater wheel, 9. The shaft 4, the shaft 8, and the beater wheel are all driven through suitable connections with sprocket wheels, 10, fixed to the rear supporting wheels, 11, of the spreader. In the arrangement shown, there is a counter shaft, 12, which is driven from the sprocket wheels 10 by means of sprocket chains, 13. A sprocket chain drive, 14, arranged between the shafts 12 and 4, and controlled by a suitable clutch device, 15, permits the shaft 4 to be driven at will. The beater wheel is driven from the shaft 4 by a suitable sprocket chain device, 16. The shaft 8 is adapted to be moved step by step by a suitable pawl and ratchet device, 17, driven from the shaft 4.

The bottom of the body or rack, underneath the rear end of the raking conveyer, is made of spring fingers, 18, supported only at their front ends. Between the beater wheel and the raking conveyer and above the spring bottom formed by the fingers 18 is an upwardly and rearwardly inclined comb, 20, made of spring fingers supported at their upper rear ends and free at their lower forward ends. The comb is so positioned that its fingers lie between the teeth 21 of the beater wheel and project at their lower ends into proximity to the spring bottom. The comb is preferably so supported that the angle which it makes to the horizontal may be varied and also so that the comb may be bodily shifted toward or from the beater wheel. This may conveniently be accomplished by bolting the back or frame, 22, of the comb to stationary braces or supports, 23, in such a manner that when the bolts are loosened the comb as a whole may be shifted bodily along the braces or supports; and, by placing washers, as indicated at 24, around the bolts, 25, between one side or other of the frame 22 and the supports, an adjustment in the angle of inclination of the comb may be effected.

When the spreader is in operation, the raking conveyer loosens material from the top of the load and feeds it gradually underneath the same toward the beater wheel. The material is first received by the inclined comb which lies above and in front of the beater wheel and which serves as a rest or support for holding the material while the teeth of the beater wheel enter through the spaces in the comb and draw the material, a little at a time, through the comb and discharge it in the rearward direction. As the material reaches the rear end of the raking conveyer its tendency is to continue around the turn with the conveyer. Such of the teeth of the beater wheel as at this time engage with the material, exert a driving force in the same direction as the conveyer so that there is no tendency to pack or crowd the material at the point where it passes from the rake to the beater wheel. If an excess of material is delivered, it will simply continue along with the conveyer and be carried forwardly on the upper side thereof and be dropped on top of the load at the front end of the spreader. This also applies to any tangle or mass of adhering straws or fibers which, instead of being compelled to leave the spreader when it reaches the beater wheel, may simply be carried past the beater wheel and, after having fragments torn therefrom by the teeth of the latter, be carried forward and again returned as a part of the top of the load; this process being repeated until the tangle or mass has been completely disintegrated and has been discharged. The spring bottom, 18, affords a yielding support which will permit comparatively large bunches or masses to be carried freely around the rear end of the raking conveyer in the manner heretofore described.

It will thus be seen that material which it would be difficult to handle effectively by forcing its discharge as and when delivered to the discharge point, no matter whether the material is thrown directly downward or over the top of a beater wheel, may be handled with perfect ease in our improved spreader which distributes at a uniform rate independent of the rate of delivery at the discharge point except, of course, that the rate of delivery must be at least as rapid as the rate of discharge.

While we have illustrated and described with particularity only a single preferred form of our invention, we do not desire to be limited to the exact structural details thus illustrated and described; but intend to cover all forms and arrangements which come within the terms employed in the definitions of our invention constituting the appended claims.

We claim:

1. In a spreader, means for feeding material from the load in the spreader to a discharge point and tending to return it to the load to be mingled therewith, and means at said discharge point permitting a portion of the material to be so returned.

2. In a spreader, means for feeding material from the exterior of the load in the spreader to a discharge point and tending to return it to the top of the load to mingle therewith, and means at said point permitting a portion of the material to be so returned.

3. In a spreader, a distributer positioned to lie in proximity to one edge of a load in the spreader, means for feeding material from the exterior of the load to the distributer and tending to carry it past the same and return it to the top of the load at a point remote from said edge, and means in the vicinity of the distributer permitting a portion of the material to be so returned.

4. In a spreader, mechanism for loosening material at the top of the load and feeding it continuously to and tending to carry it past a discharge point, and means at said discharge point for distributing said material less rapidly than it arrives.

5. In a spreader, mechanism for feeding material from the exterior of a load in the spreader continuously past a discharge point, and means at said discharge point for receiving a portion of the material traveling past the same and distributing it.

6. In a spreader, mechanism for feeding material from the exterior of a load in the spreader continuously to a discharge point and tending to carry it past said discharge point and return it to the load at a remote point to mingle with the body of the load, and means at said discharge point for distributing said material less rapidly than it arrives.

7. In a spreader, mechanism for loosening the top of the load and feeding it past a discharge point and back again to mingle with the body of the load, and means at said discharge point for distributing the material at a rate less rapid than that at which it is fed.

8. In a spreader, a rotary toothed distributer, means for feeding material from the load in a spreader past the distributer and in contact with the teeth of the latter and returning to the top of the load those portions of the fed material not carried away by the teeth of the distributer, and means adjacent to the distributer permitting a portion of the fed material to be returned to the load by the feeding means.

9. In a spreader, an endless raking conveyer mounted so as to rake the outer portion of the load to a discharge point, in combination with means at said discharge point for permitting a portion of the material to be carried back from said discharge point and be again mingled with the body of the load.

10. In a spreader, an endless raking conveyer mounted so as to rake the outer and upper portion of the load to a discharging point, means at said discharge point for permitting a portion of the material to be carried back from said discharge point and be again mingled with the body of the load, and means for maintaining said conveyer in contact with the load as the latter diminishes.

11. In a spreader, a cylindrical distributer rotatable in a direction to cause its upper peripheral portion to travel away from the spreader, and means for feeding material from the top of the load in the spreader against the front of the distributer and tending to carry it upwardly past the distributer and return it to the top of the load.

12. In a spreader, a toothed distributer rotatable in a direction to cause the teeth at the top to travel away from the spreader, and means for feeding material from the load in the spreader to the distributer and partially supporting it while in contact with the teeth of the latter and returning to the top of the load such portions of the fed material that are not carried away by the teeth of the distributer.

13. In a spreader, a partly upright supporting member having passages through the same, means for feeding material from the exterior of the load against said supporting member and tending to carry it back again to mingle with the body of the load, and a distributer lying behind said supporting member and acting through said passages to withdraw and distribute a part of the material before it is carried back to mingle with the load.

14. In a spreader, a more or less upright comb, means for loosening material from the exterior of the load and feeding it against said comb and then back again to mingle with the body of the load, and means lying in rear of said comb and acting through the same to carry away and distribute the material at a rate less rapid than that at which the material is fed to the comb.

15. In a spreader, a more or less upright comb, a toothed rotary distributer located on the outer side of the comb and having its teeth projecting inwardly through the same, means for feeding the exterior of the load in the spreader against the inner side of the comb directly in advance of the distributer and tending to carry the material back into the spreader after reaching the comb, and means for rotating the distributer in a direction to cause the teeth on the inner side thereof to travel in same direction as the material which is arriving at the comb.

16. In a spreader, a more or less upright comb, a toothed rotary distributer located on the outer side of the comb at the lower end of the latter and having its teeth projecting inwardly through the same, means for feeding material from the exterior of the load against the inner side of the comb at the lower end of the latter and tending to carry the material upwardly past the comb and return it to mingle with the body of the load, and means for driving the distributer in the direction to cause the teeth on the inner side to travel upwardly.

17. In a spreader, an endless raking conveyer having upper and lower runs adapted to loosen material by means of the lower run from the exterior of the load and feed it to a discharge point, and tend to return such material to the top of the load by means of its upper run; a distributing cylinder located at the discharge point at about the same level as the adjacent part of the conveyer and rotatable in the direction to cause its surface nearest the raking conveyer to be traveling in the same direction as the latter.

18. In a spreader, an endless raking conveyer having upper and lower runs adapted to loosen material by means of the lower run from the exterior of the load and feed it to a discharge point, and tend to return such material to the top of the load by means of its upper run; a distributing cylinder located at the discharge point at about the same level as the adjacent part of the conveyer and rotatable in the direction to cause its surface nearest the raking conveyer to be traveling in the same direction as the latter, and means between the conveyer and the distributing cylinder adapted to serve as a temporary support for the material until it is carried away by the distributing cylinder or returned by the conveyer to mingle with the body of the load.

19. In a spreader, an endless raking conveyer having upper and lower runs adapted to overlie a load in the spreader and loosen material from the top of the load, feed it to a discharge point at the rear end of the spreader and tend to carry it past the discharge point and return it to mingle with the load; a distributing cylinder located at the rear end of the spreader behind and at the same level as the adjacent part of the conveyer; and means for rotating the cylinder in the direction to cause its surface nearest the raking conveyer to travel in the same direction as the latter.

20. In a spreader, an endless raking conveyer having upper and lower runs adapted to overlie a load in the spreader and loosen material from the top of the load, feed it to a discharge point at the rear end of the spreader and tend to carry it past the discharge point and return it to mingle with the load; a distributing cylinder located at the rear end of the spreader behind and at the same level as the adjacent part of the conveyer; means for rotating the cylinder in the direction to cause its surface nearest the raking conveyer to travel in the same direction as the latter; and means between the conveyer and the distributing cylinder adapted to serve as a temporary support for the material until it is carried away by the distributing cylinder or returned by the conveyer to mingle with the body of the load.

21. In a spreader, a body or rack having a yieldable bottom at one edge, a rotary distributer at said edge adapted to rotate in the direction to cause the elements directed toward said edge to travel upwardly; and mechanism tending to feed the top of the load in the spreader toward said edge, upwardly past the distributer, and back to the body of the load to mingle therewith.

22. In a spreader, a body or rack having a yieldable bottom at one edge, a rotary distributer at said edge adapted to rotate in the direction to cause the elements directed toward said edge to travel upwardly; mechanism tending to feed the top of the load in the spreader toward said edge, upwardly past the distributer, and back to the body of the load to mingle therewith; and means between said mechanism and said distributer adapted to serve as a temporary support for the material until it is carried away by the distributer or returned to the load by said mechanism.

23. In a spreader, an endless raking conveyer mounted so as to rake the outer and upper portion of the load to a discharging point, means at said discharge point for permitting a portion of the material to be carried back from said discharge point and be again mingled with the body of the load, means for maintaining said conveyer in contact with the load as the latter diminishes, and an adjustable device arranged between the distributer and said means serving as a temporary support for the material.

24. In a spreader, means for feeding material from the load in the spreader to a discharge point and tending to return it to the load to be mingled therewith, and adjustable means at said discharge point permitting a portion of the material to be so returned.

25. In a spreader, means for progressively feeding material from the exterior of a load in the spreader to a discharge point and returning to the load such of the material as may not be discharged, and means at said discharge point for distributing the material at a rate which may be less than the rate of delivery.

In testimony whereof, we sign this specification.

HENRY L. LITCHFIELD.
VICTOR SPEER.